United States Patent
Qin et al.

(10) Patent No.: US 12,173,017 B2
(45) Date of Patent: Dec. 24, 2024

(54) BIMETALLIC METAL-ORGANIC FRAMEWORKS NANOSHEET BASED ON ZEOLITE IMIDAZOLE FRAMEWORK/MATERIALS OF INSTITUTE LAVOISIER TOPOLOGY AND PREPARATION METHOD AND APPLICATION THEREOF

(71) Applicants: Zhejiang University of Technology., Hangzhou (CN); Zhejiang Marine Fisheries Research Institute., Zhoushan (CN)

(72) Inventors: Lei Qin, Hangzhou (CN); Xiaoyan Mao, Huzhou (CN); Tiejun Li, Zhoushan (CN); Yingyu Tan, Hangzhou (CN); Wenjie Liu, Binzhou (CN); Lei Jin, Zhoushan (CN)

(73) Assignees: Zhejiang University of Technology, Hangzhou (CN); Zhejiang Marine Fisheries Research Institute, Zhoushan (CN)

( * ) Notice: Subject to any disclaimer, the term of this patent is extended or adjusted under 35 U.S.C. 154(b) by 0 days.

(21) Appl. No.: 18/654,002

(22) Filed: May 3, 2024

(65) Prior Publication Data
US 2024/0383936 A1 Nov. 21, 2024

(30) Foreign Application Priority Data

May 15, 2023 (CN) .......................... 202310539913.X

(51) Int. Cl.
| | |
|---|---|
| *C07F 15/00* | (2006.01) |
| *C07F 15/02* | (2006.01) |
| *C07F 15/06* | (2006.01) |
| *C25B 11/048* | (2021.01) |

(52) U.S. Cl.
CPC .......... *C07F 15/065* (2013.01); *C07F 15/025* (2013.01); *C25B 11/048* (2021.01)

(58) Field of Classification Search
CPC .................................................... C07F 15/065
See application file for complete search history.

(56) References Cited

PUBLICATIONS

Bartlett "Exploiting Chemical Diversity for Drug Discovery" Edited by Paul A Bartlett and Michael Entzeroth, The Royal Society of Chemistry, 2006, pp. 113-118.*
"Find ETDs Home » Thesis Resources » Find ETDs" Online: "https://ndltd.org/thesis-resources/find-etds/" Accessed Jan. 31, 2023.*
Irwin "ZINC—A Free Database of Commercially Available Compounds for Virtual Screening" J. Chem. Inf. Model. 2005, 45, 177-182.*
Kim "PubChem in 2021: new data content and improved web interfaces" Nucleic Acids Research, 2021, vol. 49, Database issue Published online Nov. 5, 2020.*
STN Registry/Zregistry (CAS RegistrySM) Sep. 2016 2 pages.*
Liu, New J. Chem., 2022, 46, 13818-13837.*
Jia, ACS Appl. Mater. Interfaces 2022, 14, 46615-46626.*
Chen, Bimetallic metal-organic frameworks and their Derivatives Chem. Sci., 2020, 11, 5369-5403.*
Song, Ultrasonics Sonochemistry 72 (2021) 105461.*

* cited by examiner

*Primary Examiner* — Nizal S Chandrakumar

(57) ABSTRACT

A BMOFs nanosheet based on a ZIF/MIL topology, and a preparation method and an application thereof are provided. The preparation method includes dispersing a MOF material of a ZIFs series in an organic phase, then adding an aqueous phase to obtain a mixture; and adding a MOF material of a MILs series into the mixture, sealing, standing for 1-5 days, filtering, performing centrifugal washing, drying, and performing acetone ultrasonic exfoliation to obtain the BMOFs nanosheet based on the ZIF/MIL topology. The preparation method is simple to operate and moderate in conditions, and the prepared ZIF/MIL BMOFs nanosheet has good electrocatalytic activity and stability in an OER.

4 Claims, 2 Drawing Sheets

BIMETALLIC METAL-ORGANIC FRAMEWORKS NANOSHEET BASED ON ZEOLITE IMIDAZOLE FRAMEWORK/MATERIALS OF INSTITUTE LAVOISIER TOPOLOGY AND PREPARATION METHOD AND APPLICATION THEREOF

CROSS-REFERENCE TO RELATED APPLICATION

This application claims priority to a Chinese patent application No. 202310539913.X, filed to China National Intellectual Property Administration (CNIPA) on May 15, 2023, which is herein incorporated by reference in its entirety.

TECHNICAL FIELD

The disclosure relates to a bimetallic metal-organic frameworks (BMOFs) nanosheet based on a zeolite imidazole framework/materials of institute Lavoisier (ZIF/MIL) topology and a preparation method thereof, and the prepared BMOFs nanosheet is applied to the field of electrocatalysis.

BACKGROUND

Metal-organic frameworks (MOFs) are porous crystals of a network structure assembled by metal ions (or metal clusters) and organic ligands and are also referred to as porous coordination polymers (PCPs). Since a development of the MOFs, there are more than 20,000 MOFs that have been developed successively; and the developed MOFs are widely applied in numerous fields. Specially, zeolite imidazole frameworks (ZIFs) are obtained by four-coordination self-assembling with zinc (Zn) or cobalt (Co) as a metal center and imidazole or its derivatives as the organic ligands. A pore structure of the ZIFs is similar to that of a silicoaluminate zeolite, which has a series of stable structures and is easy to functionalize. Compared with other types of the MOFs, the ZIFs have more excellent thermal stability and chemical stability. Moreover, materials of institute Lavoisier (MILs) are other specific MOFs and are formed by coordination of trivalent transition metal ions (such as iron abbreviated as Fe, aluminium abbreviated as Al, and chromium abbreviated as Cr) with carboxylic acid ligands (such as p-phthalic acid, trimesic acid). As for the MILs, MIL-100 (Fe) (referred to basolite F300, $C_9H_6FeO_6$) and MIL-101 (Cr) (referred to $C_{24}H_{16}Cr_3FO_{16}$) are two more common types.

In 2011, Liu et al. (i.e., Di-Jia Liu et al, Cobalt Imidazolate Framework as Precursor for Oxygen Reduction Reaction Electrocatalysts, Chemistry A European J, 2011, pp. 2063-2067, Vol. 17) use cobalt-based zeolite imidazole framework (Co-ZIF) to produce a derivative catalyst that produces a high density at an active site and possesses a high specific surface area. Specially, the derivative catalyst can reach an initial potential of 0.83 volts (V) in an oxygen reduction reaction (ORR) with reference to a reversible hydrogen electrode (RHE) and reaches a half-wave potential of 0.68 V (with reference to RHE) in 0.1 M (referred to as to a unit for molar concentration) perchloric acid. Dodelet et al. (i.e., Jean-Pol Dodelet et al, Optimized Synthesis of Fe/N/C Cathode Catalysts for PEM Fuel Cells: A Matter of Iron-Ligand Coordination Strength, Angewandte Chemistry, 2013, pp. 6867-6870, Vol. 52) add iron (Fe) as a precursor in zinc (Zn)-doped ZIF-8 (composing of zinc ions and 2-methylimidazole) to obtain an optimal catalyst for use in a proton exchange membrane fuel cell, which can obtain a power density of 0.75 watt per square centimeter (W-cm$^2$) at 0.6 V. It can be seen that the MOFs and the derivative catalysts thereof can be designed for electro-catalysts in an oxygen evolution reaction (OER).

SUMMARY

Objectives of the disclosure are to provide a bimetallic metal-organic frameworks (BMOFs) nanosheet based on a zeolite imidazole framework/materials of institute Lavoisier (ZIF/MIL) topology, which has good electrocatalytic performance and stability, and a preparation method thereof. The preparation method according to the disclosure is simple to operate and is performed under moderate conditions. An innovation of the disclosure lies in the fact that a new material is synthesized by exchanging two synthesized MOF materials. Moreover, the preparation method is controllable and simple, and is brought in for the first time in the disclosure.

A technical solution of the disclosure is as follows.

A preparation method of a BMOFs nanosheet based on a ZIF/MIL topology includes the following steps:

dispersing a MOF material of a ZIFs series in an organic phase, and then adding an aqueous phase into the organic phase dispersed with the MOF material of the ZIFs series to obtain a mixture; adding a MOF material of a MILs series into the mixture, sealing the mixture added with the MOF material of the MILs series to stand for 1-5 days (d) to obtain a suspension, filtering the suspension to obtain precipitate, performing centrifugal washing on the precipitate to obtain washed precipitate, drying the washed precipitate to obtain dried precipitate, and performing acetone ultrasonic exfoliation on the dried precipitate to obtain the BMOFs nanosheet based on the ZIF/MIL topology;

where the MOF material of the ZIFs series has lipophilicity, and is selected from the group consisting of ZIF-7(Zn) (referred to 1 h-benzimidazole zinc salt trihydrate, $C_7H_8N_2OZn$), ZIF-8(Zn) (referred to 2-methylimidazole zinc salt, $C_8H_{10}N_4Zn$), ZIF-67(Co) (referred to cobalt 2-methylimidazole, $C_4H_6CoN_2$), etc.; and where the MOF material of the MILs series has hydrophobicity and oleophobicity, and is selected from the group consisting of MIL-53(Fe) ($C_8H_4FeO_5$), MIL-101 (Fe) ($C_{24}H_{12}ClFe_3O_{13}$), etc.

In an embodiment, a mass ratio of the MOF material of the ZIFs series to the MOF material of the MILs series is in a range of 0.5-2:1.

In an illustrated embodiment, the mass ratio of the MOF material of the ZIFs series to the MOF material of the MILs series is 1:1.

The organic phase is one or more organic solvents with a density less than that of water, such as hexane, or a mixed solvent of hexane and heptane.

The aqueous phase is water or a mixed system that is miscible with water, such as a mixed solution of water and ethanol, or a mixed solution of and any polar solvent.

In an embodiment, a volume ratio of the organic phase to the aqueous phase is in a range of 1: 1-5.

In an embodiment, the volume ratio of the organic phase to the aqueous phase is 1:1.

In a mixed system of the organic phase and the aqueous phase, after the BMOFs nanosheet based on the ZIF/MIL topology is generated, the BMOFs nanosheet based on the ZIF/MIL topology is located in the aqueous phase.

Furthermore, the BMOFs nanosheet based on the ZIF/MIL topology can be calcined, and an organic ligand of the BMOFs nanosheet based on the ZIF/MIL topology is converted into a heteroatom-doped porous carbon material (HPCM).

The disclosure also provides a BMOFs nanosheet based on a ZIF/MIL topology, which is prepared by the above preparation method.

The prepared BMOFs nanosheet based on the ZIF/MIL topology according to the disclosure has good electrocatalytic activity and stability in an oxygen evolution reaction (OER) and can be applied to the field of electrocatalysis.

The disclosure has the following advantages.
1. The double MOF materials (i.e., the MOF material of the ZIFs series and the MOF material of the MILs series) have two metal active sites and exhibit better electro-catalytic performance and stable performance than those of a single-metal MOFs material.
2. Conditions in the preparation method are not required for morphology of the original MOF materials, the conditions of the preparation method are simple, and the operation for the preparation method is simple.

DETAILED DESCRIPTION OF EMBODIMENTS

Figure 1:
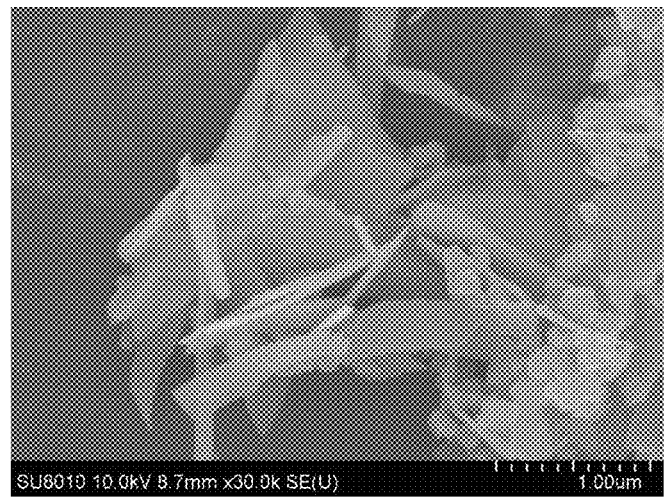
FIG. 1 illustrates a scanning electron microscope (SEM) image of a BMOFs nanosheet according to an embodiment 1 of the disclosure.
Figure 2:
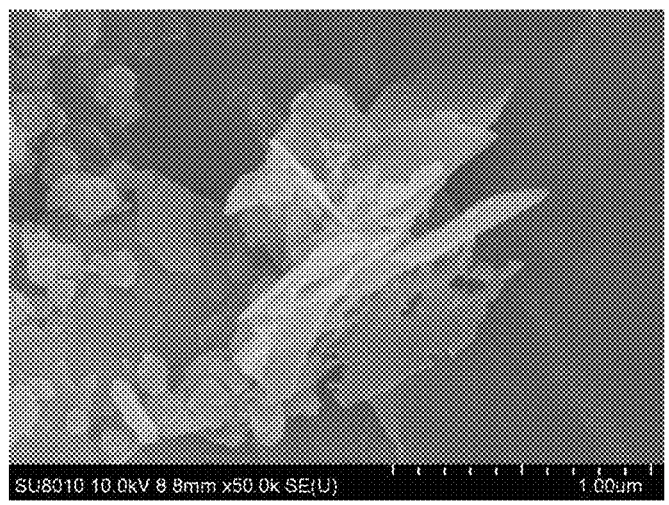
FIG. 2 illustrates a SEM image of a BMOFs nanosheet according to an embodiment 3 of the disclosure.
Figure 3:
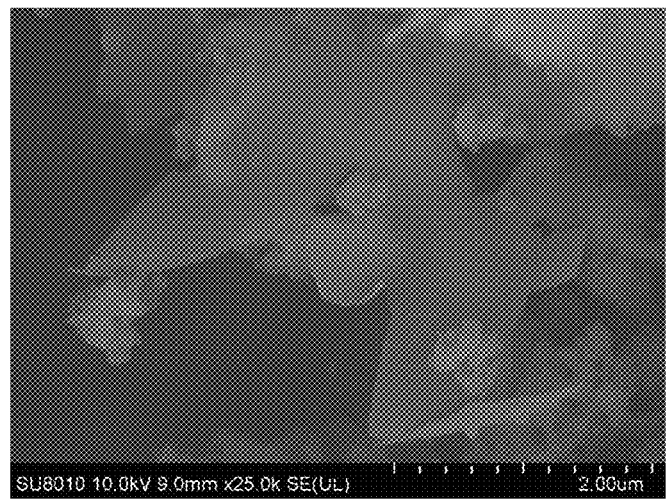
FIG. 3 illustrates a SEM image of a BMOFs nanosheet according to an embodiment 7 of the disclosure.

The disclosure will be further described in detail below with reference to embodiments and attached drawings. It should be understood that the disclosure can have various changes in different embodiments without departing from the scope of the disclosure. Furthermore, description of the embodiments and the attached drawings are intended to be illustrative in nature and are not intended to limit the disclosure.

Embodiment 1

0.100 grams (g) of ZIF-67(Co) is weighed and dispersed in 50 milliliter (mL) of hexane ($C_6H_{14}$), 50 mL of water is added into the hexane dispersed with the ZIF-67(Co) to obtain a mixture, then 0.100 g of MIL-53(Fe) is added into the mixture, the mixture added with the MIL-53(Fe) is sealed in a container, the container is stood for 1 day (d) to perform a reaction, after the reaction is completed, a suspension is obtained, the suspension is filtered to obtain precipitate, the precipitate is washed with water and ethanol for 3 times separately to obtain washed precipitate, then the washed precipitate is dried to obtain dried precipitate, and the dried precipitate is performed by acetone ultrasonic exfoliation for 30 minutes (min) to obtain a light brown ZIF/MIL BMOFs nanosheet (i.e., a BMOFs nanosheet based on a ZIF/MIL topology).

Embodiment 2

0.100 g of ZIF-7(Zn) is weighed and dispersed in 50 mL of hexane, 50 mL of water is added into the hexane dispersed with the ZIF-7(Zn) to obtain a mixture, then 0.100 g of MIL-53(Fe) is added into the mixture, the mixture added with the MIL-53(Fe) is sealed in a container, the container is stood for 1 d to perform a reaction, after the reaction is completed, a suspension is obtained, the suspension is filtered to obtain precipitate, the precipitate is washed with water and ethanol for 3 times separately to obtain washed precipitate, then the washed precipitate is dried to obtain dried precipitate, and the dried precipitate is performed by acetone ultrasonic exfoliation for 30 min to obtain a light brown ZIF/MIL BMOFs nanosheet.

Embodiment 3

0.100 g of ZIF-8(Zn) is weighed and dispersed in 50 mL of hexane, 50 mL of water is added into the hexane dispersed with the ZIF-8(Zn) to obtain a mixture, then 0.100 g of MIL-53(Fe) is added into the mixture, the mixture added with the MIL-53(Fe) is sealed in a container, the container is stood for 1 d to perform a reaction, after the reaction is completed, a suspension is obtained, the suspension is filtered to obtain precipitate, the precipitate is washed with water and ethanol for 3 times separately to obtain washed precipitate, then the washed precipitate is dried to obtain dried precipitate, and the dried precipitate is performed by acetone ultrasonic exfoliation for 30 min to obtain a light brown ZIF/MIL BMOFs nanosheet.

Embodiment 4

0.100 g of ZIF-67(Co) is weighed and dispersed in 50 mL of hexane, 50 mL of water is added into the hexane dispersed with the ZIF-67(Co) to obtain a mixture, then 0.100 g of MIL-101(Fe) is added into the mixture, the mixture added with the MIL-101(Fe) is sealed in a container, the container is stood for 1 d to perform a reaction, after the reaction is completed, a suspension is obtained, the suspension is filtered to obtain precipitate, the precipitate is washed with water and ethanol for 3 times separately to obtain washed precipitate, then the washed precipitate is dried to obtain dried precipitate, and the dried precipitate is performed by acetone ultrasonic exfoliation for 30 min to obtain a light brown ZIF/MIL BMOFs nanosheet.

Embodiment 5

0.100 g of ZIF-67(Co) is weighed and dispersed in 50 mL of hexane, 50 mL of water is added into the hexane dispersed with the ZIF-67(Co) to obtain a mixture, then 0.100 g of MIL-53(Fe) is added into the mixture, the mixture added with the MIL-53(Fe) is sealed in a container, the container is stood for 2 d to perform a reaction, after the reaction is completed, a suspension is obtained, the suspension is filtered to obtain precipitate, the precipitate is washed with water and ethanol for 3 times separately to obtain washed precipitate, then the washed precipitate is dried to obtain dried precipitate, and the dried precipitate is performed by acetone ultrasonic exfoliation for 30 min to obtain a light brown ZIF/MIL BMOFs nanosheet.

Embodiment 6

0.100 g of ZIF-67(Co) is weighed and dispersed in 50 mL of hexane, 50 mL of water is added into the hexane dispersed with the ZIF-67(Co) to obtain a mixture, then 0.100 g of MIL-53(Fe) is added into the mixture, the mixture added with the MIL-53(Fe) is sealed in a container, the container is stood for 3 d to perform a reaction, after the reaction is completed, a suspension is obtained, the suspension is filtered to obtain precipitate, the precipitate is washed with water and ethanol for 3 times separately to obtain washed precipitate, then the washed precipitate is dried to obtain dried precipitate, and the dried precipitate is performed by acetone ultrasonic exfoliation for 30 min to obtain a light brown ZIF/MIL BMOFs nanosheet.

Embodiment 7

0.100 g of ZIF-67(Co) is weighed and dispersed in 50 mL of hexane, 50 mL of a mixed solution of water and ethanol (with a volume ration of the water to the ethanol being 4:1) is added into the hexane dispersed with the ZIF-67(Co) to obtain a mixture, then 0.050 g of MIL-53(Fe) is added into the mixture, the mixture added with the MIL-53(Fe) is sealed in a container, the container is stood for 1 d to perform a reaction, after the reaction is completed, a suspension is obtained, the suspension is filtered to obtain precipitate, and the precipitate is washed with water and ethanol for 3 times separately to obtain washed precipitate, then the washed precipitate is dried to obtain dried precipitate, and the dried precipitate is performed by acetone ultrasonic exfoliation for 30 min to obtain a light brown ZIF/MIL BMOFs nanosheet.

Embodiment 8

0.100 g of ZIF-67(Co) is weighed and dispersed in 50 mL of hexane, 50 mL of water is added into the hexane dispersed with the ZIF-67(Co) to obtain a mixture, then 0.050 g of MIL-53(Fe) is added into the mixture, the mixture added with the MIL-53(Fe) is sealed in a container, the container is stood for 1 d to perform a reaction, after the reaction is completed, a suspension is obtained, the suspension is filtered to obtain precipitate, the precipitate is washed with water and ethanol for 3 times separately to obtain washed precipitate, then the washed precipitate is dried to obtain dried precipitate, and the dried precipitate is performed by acetone ultrasonic exfoliation for 30 min to obtain a light brown ZIF/MIL BMOFs nanosheet.

In a test for an oxygen evolution reaction (OER) in alkaline, an electrochemical workstation is used to determine data in the test, prepared electrodes (i.e., preparing from the obtained ZIF/MIL BMOFs nanosheet according to the embodiments 1-8) are used as anode electrodes, and a platinum (Pt) electrode is used as a cathode. Furthermore, the prepared electrodes together with the Pt electrode are tested in a potassium hydroxide (KOH) solution with a concentration of 3 M, and when a current density reaches 10 milliampere per square centimeter (mA·cm$^{-2}$), overpotential results of the prepared electrodes are tested, and a comparative example is that iridium dioxide (IrO$_2$) containing a noble metal is used as the anode electrode. Moreover, the overpotential results are illustrated in the following table:

| Name | Overpotential (mV) |
|---|---|
| ZIF-67/MIL-53(1:1-1 d) | 352 |
| ZIF-7/MIL-53(1:1-1 d) | 371 |
| ZIF-8/MIL-53(1:1-1 d) | 373 |
| ZIF-67/MIL-101(1:1-1 d) | 367 |
| ZIF-67/MIL-53(1:1-2 d) | 341 |
| ZIF-67/MIL-53(1:1-3 d) | 345 |
| ZIF-67/MIL-53(2:1-1 d-ethanol) | 340 |
| ZIF-67/MIL-53(2:1-1 d) | 391 |
| IrO$_2$ | 384 |

It can be seen from the above Table 1 that the prepared ZIF/MIL BMOFs nanosheet has good electro-catalytic performance in the OER.

What is claimed is:

1. A preparation method of a bimetallic metal-organic frameworks (BMOFs) nanosheet based on a zeolite imidazole framework/materials of institute Lavoisier (ZIF/MIL) topology, comprising the following steps:
   dispersing a MOF material of a ZIFs series in an organic phase, and then adding an aqueous phase into the organic phase dispersed with the MOF material of the ZIFs series to obtain a mixture; adding a MOF material of a MILs series into the mixture, sealing the mixture added with the MOF material of the MILs series to stand for 1-5 days (d) to obtain a suspension, filtering the suspension to obtain precipitate, performing centrifugal washing on the precipitate to obtain washed precipitate, drying the washed precipitate to obtain dried precipitate, and performing acetone ultrasonic exfoliation on the dried precipitate to obtain the BMOFs nanosheet based on the ZIF/MIL topology;
   wherein the MOF material of the ZIFs series is selected from the group consisting of ZIF-7(Zn), ZIF-8(Zn), and ZIF-67(Co);
   wherein the MOF material of the MILs series is selected from the group consisting of MIL-53(Fe), and MIL-101(Fe);
   wherein the organic phase is hexane or a mixed solvent of hexane and heptane; and
   wherein the aqueous phase is water or a mixed system that is miscible with water.

2. The preparation method of the BMOFs nanosheet based on the ZIF/MIL topology according to claim 1, wherein a mass ratio of the MOF material of the ZIFs series to the MOF material of the MILs series is in a range of 0.5-2:1.

3. The preparation method of the BMOFs nanosheet based on the ZIF/MIL topology according to claim 1, wherein the aqueous phase is the water or a mixed solution of water and ethanol.

4. The preparation method of the BMOFs nanosheet based on the ZIF/MIL topology according to claim 1, wherein a volume ratio of the organic phase to the aqueous phase is in a range of 1:1-5.

* * * * *